US012625067B2

(12) United States Patent
Divliansky et al.

(10) Patent No.: US 12,625,067 B2
(45) Date of Patent: May 12, 2026

(54) SPECTROMETER WITH ROTATED VOLUME BRAGG GRATING

(71) Applicant: University of Central Florida Research Foundation, Inc., Orlando, FL (US)

(72) Inventors: Ivan Divliansky, Orlando, FL (US); Ayman Abouraddy, Orlando, FL (US); Leonid Glebov, Orlando, FL (US); Oussama Mhibik, Oviedo, FL (US); Murat Yessenov, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 205 days.

(21) Appl. No.: 18/532,698

(22) Filed: Dec. 7, 2023

(65) Prior Publication Data
US 2024/0192129 A1      Jun. 13, 2024

Related U.S. Application Data

(60) Provisional application No. 63/430,805, filed on Dec. 7, 2022.

(51) Int. Cl.
*G01N 21/31* (2006.01)

(52) U.S. Cl.
CPC ..... *G01N 21/31* (2013.01); *G01N 2201/0635* (2013.01); *G01N 2201/127* (2013.01)

(58) Field of Classification Search
None
See application file for complete search history.

(56) References Cited

U.S. PATENT DOCUMENTS 6,181,427 B1 * 1/2001 Yarussi .................. G01N 21/55
356/328
2005/0105084 A1   5/2005 Wang et al.
(Continued)

FOREIGN PATENT DOCUMENTS

CN        108459367 A      8/2018

OTHER PUBLICATIONS

Glebov, A.L., Mokhun, O., Rapaport, A., Vergnole, S., Smirnov, V. and Glebov, L.B., May 2012. Volume Bragg gratings as ultra-narrow and multiband optical filters. In Micro-Optics 2012 (vol. 8428, pp. 42-52). SPIE. (Year: 2012).*
(Continued)

*Primary Examiner* — Dominic J Bologna
*Assistant Examiner* — Mohamed Doumbia
(74) *Attorney, Agent, or Firm* — Suiter Swantz IP

(57)                ABSTRACT

A spectrometer may include a rotated volume Bragg grating (r-VBG) within a volume of a material having an input face, where the r-VBG reflects portions of input light propagating through the input face that satisfies a Bragg condition for wavelengths within a spectral band, where a period of the r-VBG along the grating vector is chirped to vary along the grating vector to provide that the Bragg condition is satisfied for different wavelengths at different depths, and where a spectrum of the input light is spatially resolved in the reflected portions of the input light by the r-VBG. The spectrometer may further include a multi-pixel detector configured to receive the reflected portions of the input light from the r-VBG, where the multi-pixel detector is configured to output spectral data indicative of the spectrum of the input light within the spectral band.

29 Claims, 15 Drawing Sheets

(56)          References Cited

U.S. PATENT DOCUMENTS

| | | |
|---|---|---|
| 2006/0221449 A1 | 10/2006 | Glebov et al. |
| 2007/0153862 A1 | 7/2007 | Shchegrov et al. |
| 2011/0206070 A1 | 8/2011 | Karavitis |
| 2014/0268314 A1 | 9/2014 | Dueck |
| 2014/0348200 A1 | 11/2014 | Arumugam et al. |
| 2015/0378080 A1 | 12/2015 | Georgiou et al. |
| 2016/0116656 A1 | 4/2016 | Glebov et al. |
| 2017/0131546 A1 | 5/2017 | Woltman et al. |
| 2017/0131551 A1 | 5/2017 | Robbins et al. |
| 2020/0371387 A1 | 11/2020 | Gollier et al. |
| 2020/0387043 A1 | 12/2020 | Blanche |
| 2021/0354129 A1* | 11/2021 | Meng ................ B01L 3/502707 |
| 2021/0367391 A1 | 11/2021 | Bernier et al. |
| 2022/0034791 A1 | 2/2022 | Zhang |
| 2022/0137411 A1 | 5/2022 | Lam et al. |
| 2022/0283376 A1 | 9/2022 | Waldern et al. |
| 2022/0283540 A1 | 9/2022 | Trepanier et al. |
| 2022/0299868 A1 | 9/2022 | Lane et al. |
| 2022/0365482 A1 | 11/2022 | Yu et al. |

OTHER PUBLICATIONS

Bandyopadhyay et al., "Highly efficient free-space fiber coupler with 45 tilted fiber grating to access remotely placed optical fiber sensors," Optics Express, vol. 28, No. 11, May 25, 2020, 10 pages.

Bharathan et al., "In-fiber polarizer based on a 45-degree tilted fluoride fiber Bragg grating for mid-infrared fiber laser technology," OSA Continuum vol. 1, No. 1, Sep. 15, 2018, 8 pages.

Ciapurin et al., "Modeling of phase volume diffractive gratings, part 1: transmitting sinusoidal uniform gratings," Optical Engineering 45, 015802, Jan. 2006, 10 pages.

Ciapurin et al., "Modeling of phase volume diffractive gratings, part 2: reflecting sinusoidal uniform gratings, Bragg mirrors," Optical Engineering 51, 058001, May 2012, 11 pages.

International Search Report and Written Opinion received in International Application No. PCT/US2023/082985, Mar. 7, 2024, 9 pages.

International Search Report and Written Opinion received in International Application No. PCT/US2023/082987, Mar. 19, 2024, 10 pages.

International Search Report and Written Opinion received in International Application No. PCT/US2023/082995, Mar. 13, 2024, 8 pages.

International Search Report and Written Opinion received in International Application No. PCT/US2023/082997, May 2, 2024, 7 pages.

Mhibik et al., "Compact dual-band spectral analysis via multiplexed rotated chirped vol. Bragg gratings," Optics Letters, the College of Optics & Photonics, University of Central Florida, Sep. 5, 2023, 5 pages.

Mhibik et al., "Rotated chirped vol. Bragg gratings for compact spectral analysis," Optics Letters, vol. 48, No. 5, the College of Optics and Photonics, University of Central Florida, Mar. 1, 2023, 4 pages.

Yessenov et al., "Ultra-compact synthesis of space-time wave packets," Optics Letters, vol. 48, No. 10, the College of Optics & Photonics, University of Central Florida, Department of Electrical and Computer Engineering, University of Utah, May 15, 2023, 4 pages.

* cited by examiner

400

402 — DIRECTING INPUT LIGHT THROUGH AN INPUT FACE OF A MATERIAL INCLUDING A CHIRPED ROTATED VOLUME BRAGG GRATING (R-VBG)

404 — CAPTURING THE REFLECTED PORTIONS OF THE INPUT LIGHT FROM AN OUTPUT FACE OF THE MATERIAL WITH A MULTI-PIXEL DETECTOR

406 — DETERMINING A SPECTRUM OF THE INPUT LIGHT WITHIN THE SPECTRAL BAND BASED ON OUTPUT SPECTRAL DATA FROM THE MULTI-PIXEL DETECTOR

SPECTROMETER WITH ROTATED VOLUME BRAGG GRATING

CROSS-REFERENCE TO RELATED APPLICATION

The present application claims the benefit under 35 U.S.C. § 119(e) of U.S. Provisional Application Ser. No. 63/430,805, filed Dec. 7, 2022, which is incorporated herein by reference in the entirety.

TECHNICAL FIELD

The present disclosure relates generally to spectrometers and, more particularly, to spectrometers incorporating rotated volume Bragg gratings.

BACKGROUND

It is often highly desirable to miniaturize optical components to provide compact and robust implementation. However, in many cases, miniaturization of optical components does not eliminate free-space propagation requirements and thus provides only limited impact. For example, replacing a conventional lens with an ultrathin metasurface may reduce the physical size of the lens, but does not substantially reduce the free-space propagation length required for image formation. As another example, traditional techniques for miniaturizing components within optical spectrometers suitable for spatially resolving the spectrum of light do not substantially impact free-space propagation requirements and thus also has limited impact on overall device size.

There is therefore a need to develop systems and methods to address the above deficiencies.

SUMMARY

A spectrometer is disclosed in accordance with one or more illustrative embodiments of the present disclosure. In embodiments, the spectrometer includes a rotated volume Bragg grating (r-VBG) within a volume of a material having an input face, wherein the r-VBG is formed as planes of refractive index variation with periodicity along a grating vector at a non-zero angle relative to a normal vector of the input face, wherein the r-VBG reflects portions of input light propagating through the input face that satisfies a Bragg condition for wavelengths within a spectral band, wherein a period of the r-VBG along the grating vector is chirped to vary along the grating vector to provide that the Bragg condition is satisfied for different wavelengths at different depths, wherein a spectrum of the input light is spatially resolved in the reflected portions of the input light by the r-VBG. In embodiments, the spectrometer includes a multi-pixel detector configured to receive the reflected portions of the input light from the r-VBG, wherein the multi-pixel detector is configured to output spectral data indicative of the spectrum of the input light within the spectral band.

In embodiments, the non-zero angle between the normal vector of the input face and the grating vector of the r-VBG is 45 degrees.

In embodiments, the spectrometer further includes a controller including one or more processors configured to execute program instructions causing the one or more processors to receive the data from the multi-pixel detector and calibrate the spectral data based on calibration data to provide calibrated spectral data.

In embodiments, the spectrometer further includes a display configured to provide a visual representation of the spectrum of the input light.

In embodiments, the multi-pixel detector is in contact with an output face of the material.

In embodiments, the period of the r-VBG along the grating vector is chirped to vary monotonically along the grating vector. In embodiments, the period of the r-VBG along the grating vector is chirped to vary linearly along the grating vector.

In embodiments, the period of the r-VBG along the grating vector is chirped with a distribution selected to provide that the reflected portions of the input light by the r-VBG are spatially resolved across the output face within a distribution that is linear as a function of wavelength.

In embodiments, the multi-pixel detector includes at least one of a charge coupled device (CCD), a complementary metal-oxide-semiconductor (CMOS) device, or an array of photodiodes.

In embodiments, the spectrometer includes an additional r-VBG, wherein the additional r-VBG is formed as planes of refractive index variation with periodicity along one or more additional grating vectors at one or more additional non-zero angles relative to the normal vector of the input face, wherein the additional r-VBG reflects portions of input light propagating along the incidence vector through the input face that satisfies a Bragg condition for wavelengths within an additional spectral band, wherein a period of the additional r-VBG along the additional grating vector is chirped to vary along the grating vector to provide that the Bragg condition is satisfied for different wavelengths within the additional spectral band at different depths, and where the spectrum of the input light in the additional spectral band is spatially resolved in the reflected portions of the input light by the additional r-VBG. In embodiments, the spectrometer includes an additional multi-pixel detector configured to receive the reflected portions of the input light from the additional r-VBG through the additional output face, wherein the multi-pixel detector is configured to output additional spectral data indicative of a spectrum of the input light in the additional spectral band.

In embodiments, the non-zero angle between the normal vector of the input face and the grating vector of the r-VBG is +45 degrees, wherein the non-zero angle between the normal vector of the input face and the grating vector of the additional r-VBG is −45 degrees.

In embodiments, the spectral band and the additional spectral band are non-overlapping. In embodiments, the spectral band and the additional spectral band at least partially overlap.

A method is disclosed in accordance with one or more illustrative embodiments of the present disclosure. In embodiments, the method includes directing input light through an input face of a material including a rotated chirped volume Bragg grating (r-VBG) within a volume of the material, wherein the r-VBG is formed as planes of refractive index variation with periodicity along a grating vector at a non-zero angle relative to a normal vector of the input face, wherein the r-VBG reflects portions of input light propagating along an incidence vector through the input face that satisfies a Bragg condition for wavelengths within a spectral band, wherein a period of the r-VBG along the grating vector is chirped to vary along the grating vector to provide that the Bragg condition is satisfied for different depths, wherein the reflected portions of the input light by the r-VBG are spatially resolved in the reflected portions of the input light by the r-VBG. In embodiments, the method includes capturing the reflected portions of the input light from the output face with a multi-pixel detector. In embodiments, the method includes determining a spectrum of the input light within the spectral band based on output spectral data from the multi-pixel detector.

In embodiments, the non-zero angle between the normal vector of the input face and the grating vector of the r-VBG is 45 degrees.

In embodiments, the method further includes calibrating the spectral data received from the multi-pixel detector. In embodiments, the method further includes displaying a visual representation of the spectrum of the input light on a display.

In embodiments, the multi-pixel detector is in contact with an output face of the material.

In embodiments, the period of the r-VBG along the grating vector is chirped to vary monotonically along the grating vector.

In embodiments, the period of the r-VBG along the grating vector is chirped to vary linearly along the grating vector.

In embodiments, the period of the r-VBG along the grating vector is chirped to vary monotonically along the grating vector with a distribution selected to provide that the reflected portions of the input light by the r-VBG are spatially resolved across the output face within a distribution that is linear as a function of wavelength.

A spectrometer is disclosed in accordance with one or more illustrative embodiments of the present disclosure. In embodiments, the spectrometer includes two or more rotated volume Bragg gratings (r-VBGs), wherein each of the r-VBGs is formed as planes of refractive index variation with periodicity along a respective grating vector at a respective non-zero angle relative to a normal vector of a respective input face of a respective material, wherein each the r-VBGs reflects portions of input light that satisfies a Bragg condition for a wavelengths within a respective spectral band, wherein a period of each the r-VBGs along the respective grating vector is chirped to vary along the respective grating vector with a distribution providing that the Bragg condition is satisfied for different wavelengths within the respective spectral band at different locations and further providing that the reflected portions of the input light are spatially resolved in the reflected portions of the input light by the r-VBG. In embodiments, the spectrometer includes two or more multi-pixel detectors, each configured to generate spectral data indicative of a spectrum of the input light from a respective one of the r-VBGs.

In embodiments, at least two of the two or more r-VBGs are multiplexed within a common volume. In embodiments, at least two of the two or more r-VBGs are cascaded. In embodiments, at least two of the two or more r-VBGs are cascaded in a common material. In embodiments, at least two of the two or more r-VBGs are cascaded in different materials.

In embodiments, the spectral bands associated with the two or more r-VBGs are non-overlapping. In embodiments, the spectral band associated with one of the r-VBGs at least partially overlaps the spectral band associated with another of the r-VBGs.

In embodiments, the respective grating vectors for each of the r-VBGs is different.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1A:
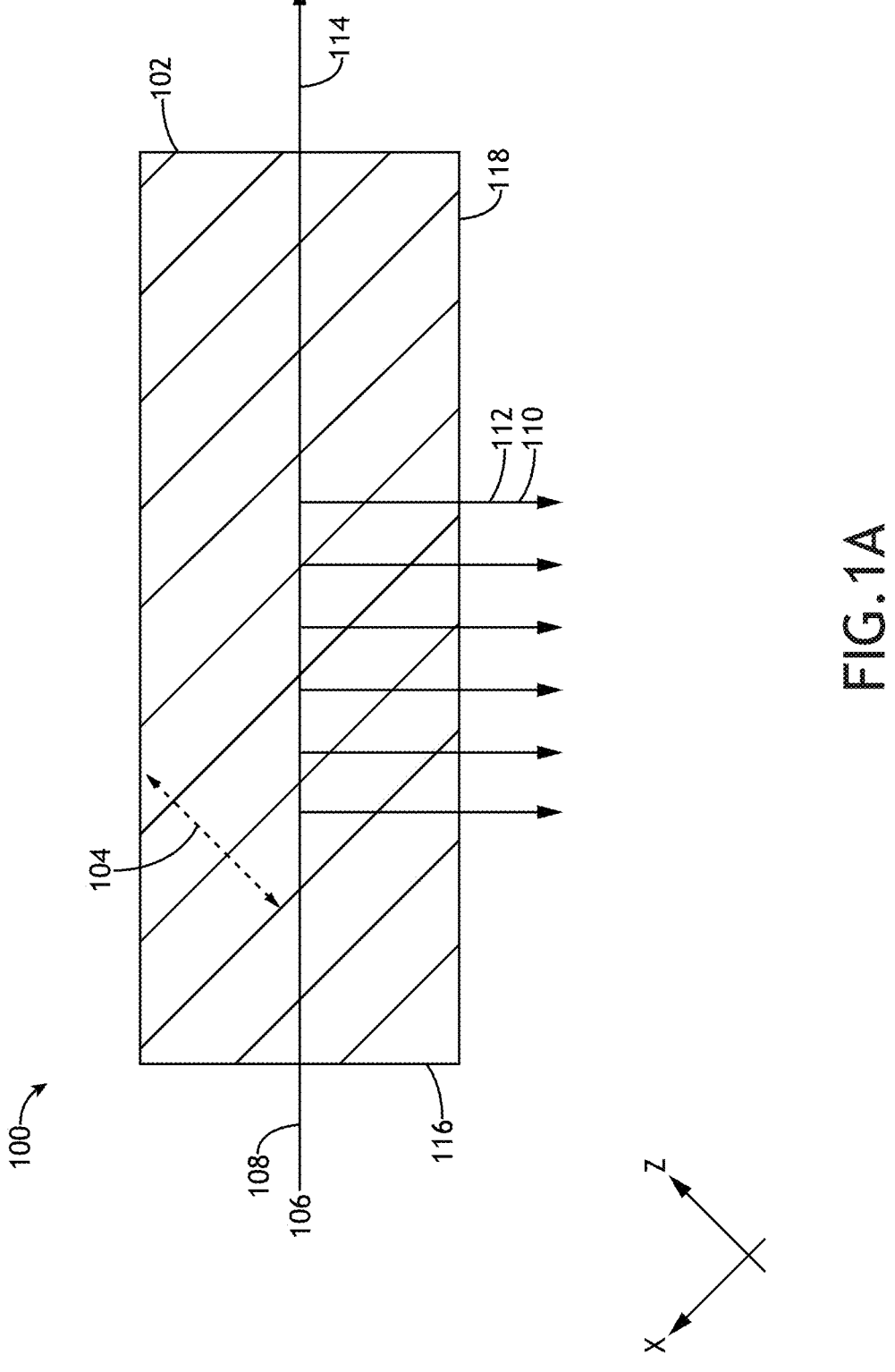
FIG. 1A is a top view of a rotated volume Bragg grating (r-VBG) with a uniform period, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for spatially resolving a spectrum of light using one or more rotated volume Bragg gratings (r-VBGs).

As used herein an r-VBG is formed as a VBG having a grating vector direction of the rotated relative to an input face of a material or an expected direction of incident light. VBGs are generally described in Igor V. Ciapurin, et al., "Modeling of phase volume diffractive gratings, part 1: transmitting sinusoidal uniform gratings," Optical Engineering 45 (2006) 015802, 1-9; and Igor V. Ciapurin, et al., "Modeling of phase volume diffractive gratings, part 2: reflecting sinusoidal uniform gratings, Bragg mirrors," Optical Engineering 51 (2012) 058001, 1-10, both of which are incorporated herein by reference in their entireties. Further, transmissive VBGs (e.g., VBGs for which light satisfying a Bragg condition is diffracted as a transmitted beam) configured as transmissive phase masks are described generally in U.S. Patent Publication No. 2016/0116656 published on Apr. 28, 2016, which is incorporated herein by reference in its entirety.

Some embodiments of the present disclosure are directed to a spectrometer including one or more r-VBGs having a chirped variation of refractive index along a grating vector direction, where the grating vector direction is oriented at a non-zero angle relative to an incidence direction of input light. It is contemplated herein that such a configuration may spatially resolve the spectrum of the input light in a highly compact package. In particular, such a configuration provides that a Bragg condition for reflection may be satisfied for different wavelengths at different depths of the chirped r-VBG. A detector may then be placed near the r-VBG (or even in contact with the r-VBG) to receive the spatially resolved spectrum of input light. Notably, the resolution at which the spectrum of incident light is spatially spread depends on the particular distribution of the refractive index variation of the r-VBG along the propagation direction. As a result, such a device has no requirement for free-space propagation of the spectral components and may thus provide an extraordinarily compact spectroscopic solution.

In some embodiments, a spectrometer includes multiple r-VBGs to provide measurements of different spectral ranges. In this case, the r-VBGs may be formed in a common volume (e.g., multiplexed) and/or cascaded.

Referring now to FIGS. 1A-4, systems and methods for spectroscopy with at least one r-VBG 100 are described in greater detail, in accordance with one or more embodiments of the present disclosure.

A VBG may be formed as a grating structure associated within the volume of material 102 with a periodic variation of refractive index along a grating vector direction $$104k = \frac{2\pi}{d}.$$

The material may include a photosensitive material or any other suitable material. This grating structure is typically extended in directions perpendicular to the grating vector direction 104. Put another way, a VBG may typically have a constant refractive index within any plane normal to the grating vector direction 104, where the refractive index along the grating vector direction 104 varies periodically. Further, a VBG may generally have any selected variation of the refractive index along the grating vector direction 104 so long as a Bragg condition is satisfied for at least one wavelength in at least a portion of the VBG. For example, the refractive index n of a traditional VBG may be a simple sinusoidal function with a constant (e.g., uniform) period along the grating vector direction 104. As another example, the refractive index n of a chirped VBG may have a variable period along the grating vector direction 104 and may thus satisfy a Bragg condition for different wavelengths at different locations. As another example, the refractive index variation ($\delta$n) of an apodized VBG may vary along the grating vector direction 104.

An r-VBG 100 may then be formed as a VBG with a grating vector direction 104 oriented at an angle from an expected incidence direction 106 of input light 108 (e.g., an input beam) or at an angle with respect to an input face 116 of the material in which the VBG is formed. Similarly, an r-VBG 100 may generally have any refractive index distribution along the grating vector direction 104 that satisfies a Bragg condition for light of at least one wavelength incident along the incidence direction 106.

Figure 1B:
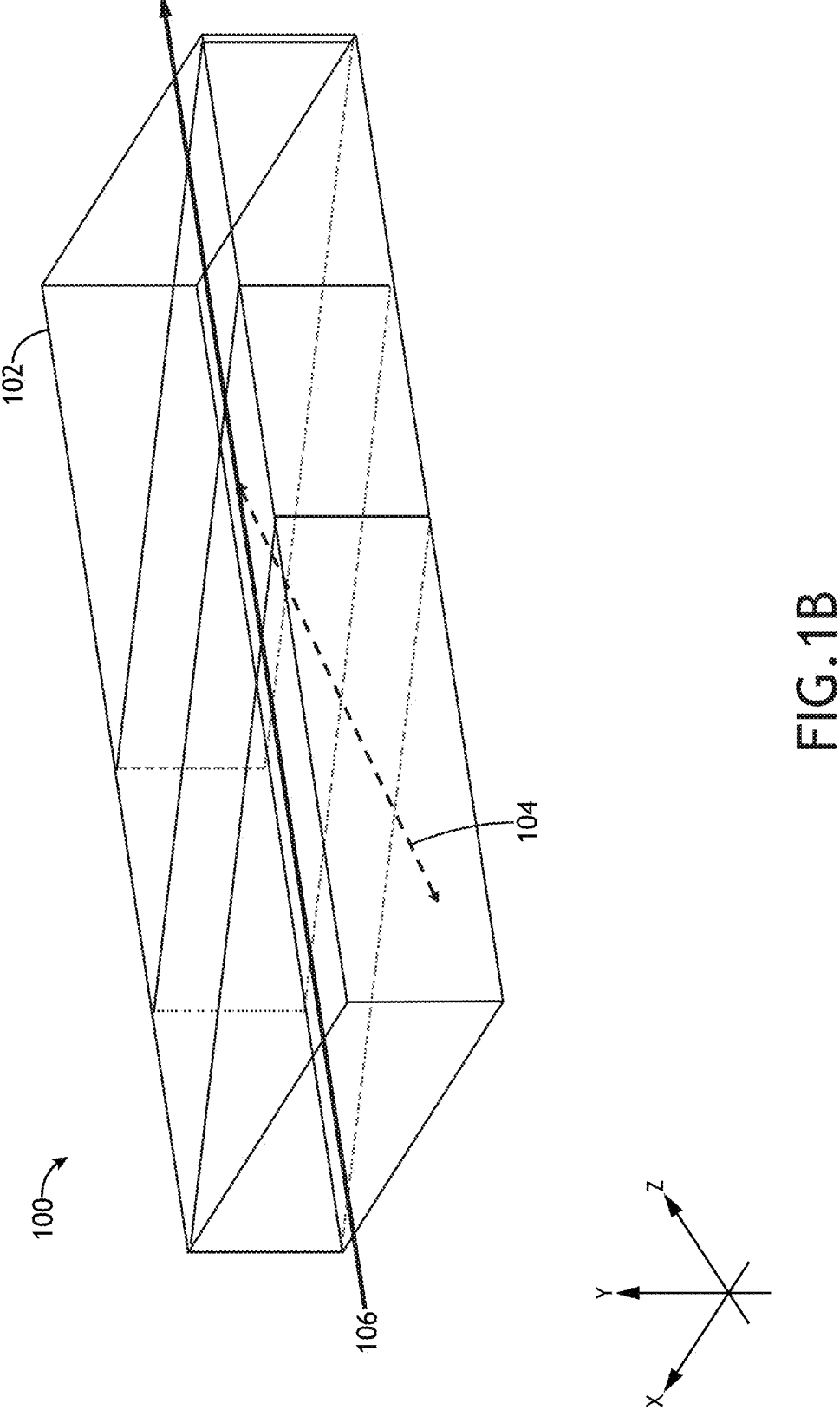
FIG. 1B is a perspective view of the r-VBG of FIG. 1A, in accordance with one or more embodiments of the present disclosure.

FIG. 1A is a top view of an r-VBG 100 with a uniform period, in accordance with one or more embodiments of the present disclosure. FIG. 1B is a perspective view of the r-VBG 100 of FIG. 1A, in accordance with one or more embodiments of the present disclosure.

In FIGS. 1A and 1B, the grating vector direction 104 corresponds to a Z axis. The refractive index variation of the r-VBG 100 depicted in FIGS. 1A and 1B may then be characterized as:

$$n(z) = n_0 + \delta n \cos\left(\frac{2\pi}{\Lambda_0} \cdot z\right) \tag{1}$$

where $n_0$ is an average refractive index of a material 102 in which the r-VBG 100 is formed, $\delta$n is a refractive index contrast, and $\Lambda_0$ is a period of the refractive index variation along the grating vector direction 104. Further, the refractive index at any particular value of z may be constant along a corresponding plane orthogonal to the grating vector direction 104 (e.g., an X-Y plane). It is noted that the figures depict variations of refractive index along the grating vector direction 104 as simple lines, but this is merely illustrative and should not be interpreted as limiting the scope of the present disclosure. It is to be understood that Equation (2) is merely illustrative and not limiting on the scope of the present disclosure. Rather, an r-VBG 100 may include any refractive index distribution suitable for reflecting light via Bragg reflection. For example, as will be described in greater detail below, the period of the refractive index variation ($\Lambda_0$) may vary along the grating vector direction 104 (e.g., forming a chirped r-VBG 100). As another example, the refractive index contrast ($\delta$n) may also vary along the grating vector direction 104, which is referred to herein as apodization such that an r-VBG 100 with a refractive index contrast ($\delta$n) that varies along the grating vector direction 104 is an apodized r-VBG 100. In this configuration, the diffraction efficiency may also vary along the grating vector direction 104.

An r-VBG 100 may reflect light via Bragg diffraction when a Bragg condition is satisfied for a particular wavelength and incidence direction 106 and transmit light otherwise. For example, FIGS. 1A and 1B depict input light 108 along an incidence direction 106, where a portion of the input light 108 is reflected via Bragg diffraction along a reflection direction 110 (e.g., as reflected light 112) and a portion of the input light 108 is transmitted along the input light 108 (e.g., as transmitted light 114). Notably, the incidence direction 106 and the reflection direction 110 lie within a diffraction plane (e.g., a plane of diffraction) formed by the grating vector direction 104 and the incidence direction 106. In FIGS. 1A and 1B, the diffraction plane corresponds to the X-Z plane. Notably, reflected light 112 and transmitted light 114 also lie within the diffraction plane.

The reflected light 112 may be spatially extended (e.g., spatially chirped) along the incidence direction 106 as demonstrated in FIG. 1A. The extent of the spatial chirp along the incidence direction 106 may depend on various factors such as, but not limited to, a diffraction efficiency of Bragg diffraction that produces the reflected light 112. In this way, the depiction of six rays of reflected light 112 in FIG. 1A is merely illustrative and should not be interpreted as limiting the present disclosure. Further, the depiction of the location of the reflected light 112 along the incidence direction 106 is also merely illustrative and should not be interpreted as limiting the present disclosure. Some figures depict reflected light 112 as a single ray, but this is again for illustrative purposes and should not be interpreted as limiting the present disclosure.

The reflected wavelength (e.g., a wavelength at which a Bragg condition is satisfied) may be characterized by:

$$\lambda(\phi) = 2\Lambda_0 \sqrt{n_0^2 - \sin^2\phi} \tag{2}$$

where $\phi$ is an angle between the grating vector direction 104 and an incidence direction 106. Equation (2) illustrates that the reflected wavelength decreases as the angle $\phi$ increases between 0 and 45 degrees. Further, for the particular case of $\phi=45°$, the reflected wavelength is $\lambda(45°)=\sqrt{2}\Lambda_0 n_0$.

It is contemplated herein that the material 102 in which an r-VBG 100 is formed may have any shape and/or any number of faces at any orientation with respect to the grating vector direction 104. In some embodiments, an r-VBG 100 and one or more faces of the material 102 are co-designed to provide that light propagates normally through one or more faces. Such a configuration may be useful for, but not limited to, mitigating dispersion at the face. For example, as depicted in FIG. 1A, the grating vector direction 104 may be oriented at a non-zero angle with respect to a normal of an input face 116, which may be suitable for, but not limited to, applications in which input light 108 is expected to propagate through the input face 116 at normal incidence. As another example, as also depicted in FIG. 1A, an output face 118 may be oriented such that reflected light 112 (e.g., of a known wavelength based on a known incidence direction 106) exits the material 102 through the output face 118 at normal incidence.

Figure 1C:
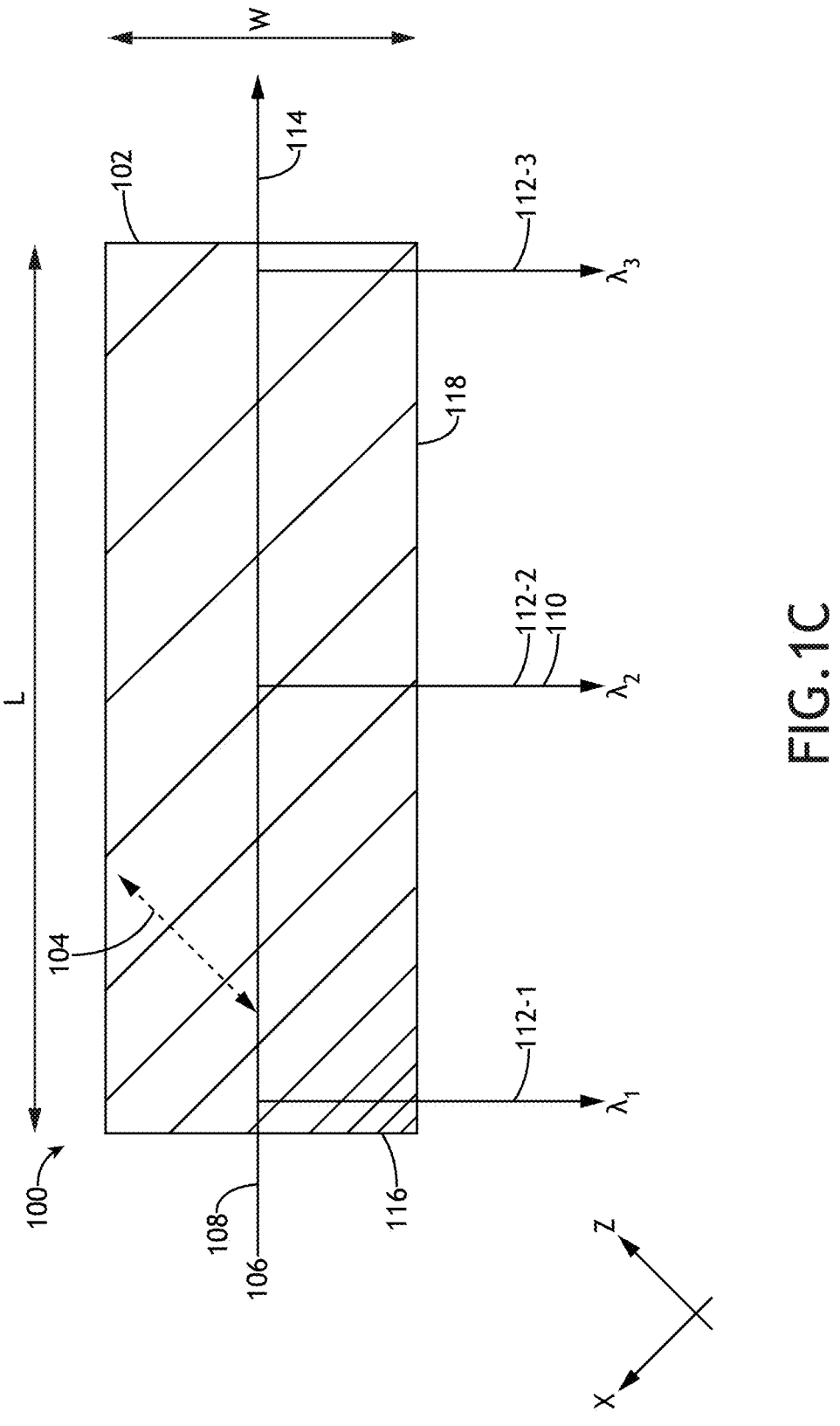
FIG. 1C is a top view of an r-VBG with linear chirp along the grating vector direction, in accordance with one or more embodiments of the present disclosure.

Referring now to FIG. 1C, the properties of an r-VBG 100 with a non-uniform refractive index distribution along the grating vector direction 104 (e.g., a chirped distribution) is described.

As indicated previously herein, an r-VBG 100 may generally have any refractive index distribution along the grating vector direction 104 that satisfies a Bragg condition for light of at least one wavelength propagating along an incidence direction 106 that is different than the grating vector direction 104. In some embodiments, a period of the refractive index variation varies monotonically along the grating vector direction 104 (e.g., monotonically increases or decreases). For example, the period may vary linearly, quadratically, or by any other distribution. An r-VBG 100 with a non-uniform refractive index variation along the grating vector direction 104 may be referred to as a rotated chirped Volume Bragg grating and may be abbreviated as r-CVBG or r-CBG.

FIG. 1C is a top view of an r-VBG 100 with linear chirp along the grating vector direction 104, in accordance with one or more embodiments of the present disclosure. For example, the refractive index variation of an r-VBG 100 with linear chirp may be characterized as:

$$n(z)=n_0+\delta n\,\cos\{Qz+\beta(z-0.5L)^2\} \tag{3}$$

where $$Q \approx \frac{4\pi}{\lambda_0}n_0,$$

$\beta$ is a chirp rate, and L is a length of the r-VBG 100 along the incidence direction 106.

In this configuration, different wavelengths are reflected by the r-VBG 100 at different depths along the incidence direction 106. Put another way, the Bragg condition may be satisfied for different wavelengths at different depths along the incidence direction 106. This is illustrated in FIG. 1C by a first ray of reflected light 112-1 with a first wavelength $\lambda_1$ at a first depth along the incidence direction 106, a second ray of reflected light 112-2 with a second wavelength $\lambda_2$ at a second depth along the incidence direction 106, and a third ray of reflected light 112-3 with a third wavelength $\lambda_3$ at a third depth along the incidence direction 106. More particularly, it can be shown for the configuration of FIG. 1C that the reflected wavelength may be characterized as:

$$\lambda(z)=\lambda_0-\gamma z, \text{ and} \tag{4}$$

$$\gamma = \frac{\lambda_0^2}{2\pi n_0}\beta, \tag{5}$$

where $\lambda_0$ is a first reflected wavelength.

As a result, the reflected light 112 may be spectrally chirped (e.g., spectrally resolved) along the incidence direction 106 and also temporally chirped due to the difference in path lengths as a function of wavelength. A spectrally resolved bandwidth $\Delta\lambda$ (e.g., a resolution of the r-VBG 100) may be characterized as:

$$\Delta\lambda = \frac{n_0|\gamma|}{\sqrt{n_0^2 - \sin^2\phi}} \cdot L. \tag{6}$$

Accordingly, the resolved bandwidth may generally be increased by increasing the length of the r-VBG 100 along the incidence direction 106 (L). The primary constraint on the width W of the r-VBG 100 orthogonal to the incidence direction 106 is diffraction as it propagates along the incidence direction 106.

Figure 1D:
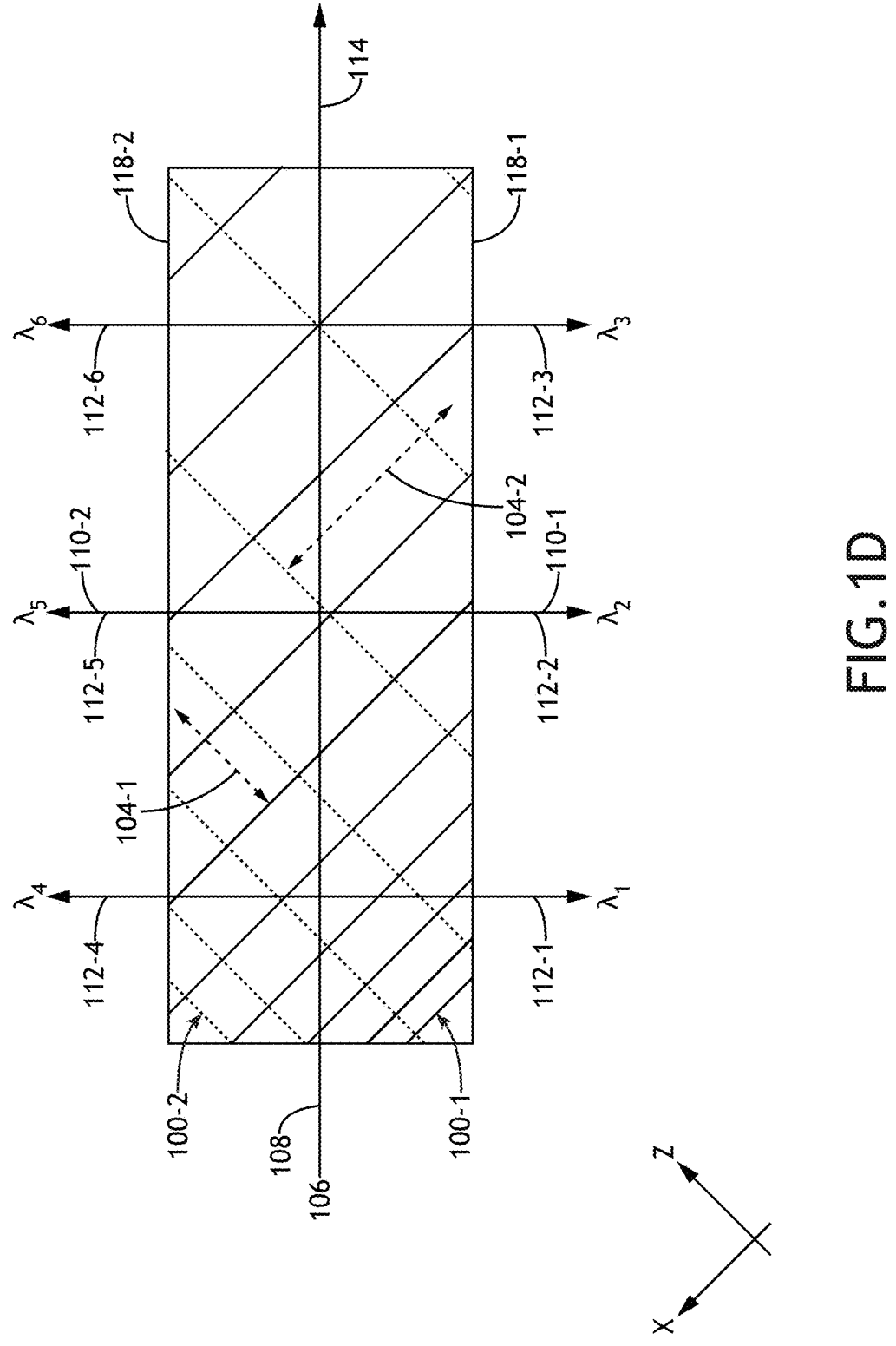
FIG. 1D is a top view of a material including two multiplexed chirped r-VBGs with different grating vector directions, in accordance with one or more embodiments of the present disclosure.

Referring now to FIG. 1D, the fabrication of multiple r-VBGs 100 within a common volume of material 102 (e.g., multiplexed fabrication) is described in greater detail, in accordance with one or more embodiments of the present disclosure.

In a general sense, any number of r-VBGs 100 of any type (e.g., uniform, chirped, or the like) may be fabricated in a common volume of a material 102. Further, each r-VBG 100 may have a grating vector direction 104 along any selected direction. For example, multiple r-VBGs 100 may be fabricated within a common volume that have a common grating vector direction 104 but different refractive index distributions along the common grating vector direction 104 (e.g., different uniform periods, different chirp rates, or the like). Such a configuration may be suitable for, but not limited to, generating multiple beams of reflected light 112 out of a single output face. As another example, multiple r-VBGs 100 may be fabricated within a common volume that have different grating vector directions 104, where the r-VBGs 100 may have the same or different refractive index distributions along the respective grating vector directions 104. Such a configuration may be suitable for, but not limited to, generating multiple beams of reflected light 112 that propagate along different directions and potentially out of different output faces.

FIG. 1D is a top view of a material 102 including two multiplexed chirped r-VBGs 100 with different grating vector directions 104, in accordance with one or more embodiments of the present disclosure. In particular, FIG. 1D depicts a first r-VBG 100-1 with a first refractive index distribution along a first grating vector direction 104-1 and a second refractive index distribution along a second r-VBG 100-2 with second grating vector direction 104-2. In FIG. 1D, the first grating vector direction 104-1 is orthogonal to the second grating vector direction 104-2 and oriented at 45-degrees relative to the incidence direction 106. In this way, the first r-VBG 100-1 may generate first reflected light 112-1 through 112-3 having a first wavelength distribution (represented as $\lambda_1$ through $\lambda_3$) that exits through a first output face 118-1, whereas the second r-VBG 100-2 may generate second reflected light 112-4 through 112-6 having a second wavelength distribution (represented as $\lambda_4$ through $\lambda_6$) that exits through a second output face 118-2.

It is to be understood that the particular configuration depicted in FIG. 1D and the associated description are merely illustrative and should not be interpreted as limiting the scope of the present disclosure. In general, multiple r-VBGs 100 with different chirp distributions may have any grating vector directions 104 and may reflect light within any overlapping or non-overlapping spectral bands. Further, although not shown, uniform and chirped r-VBGs 100 may be multiplexed within a common volume.

Figure 1E:
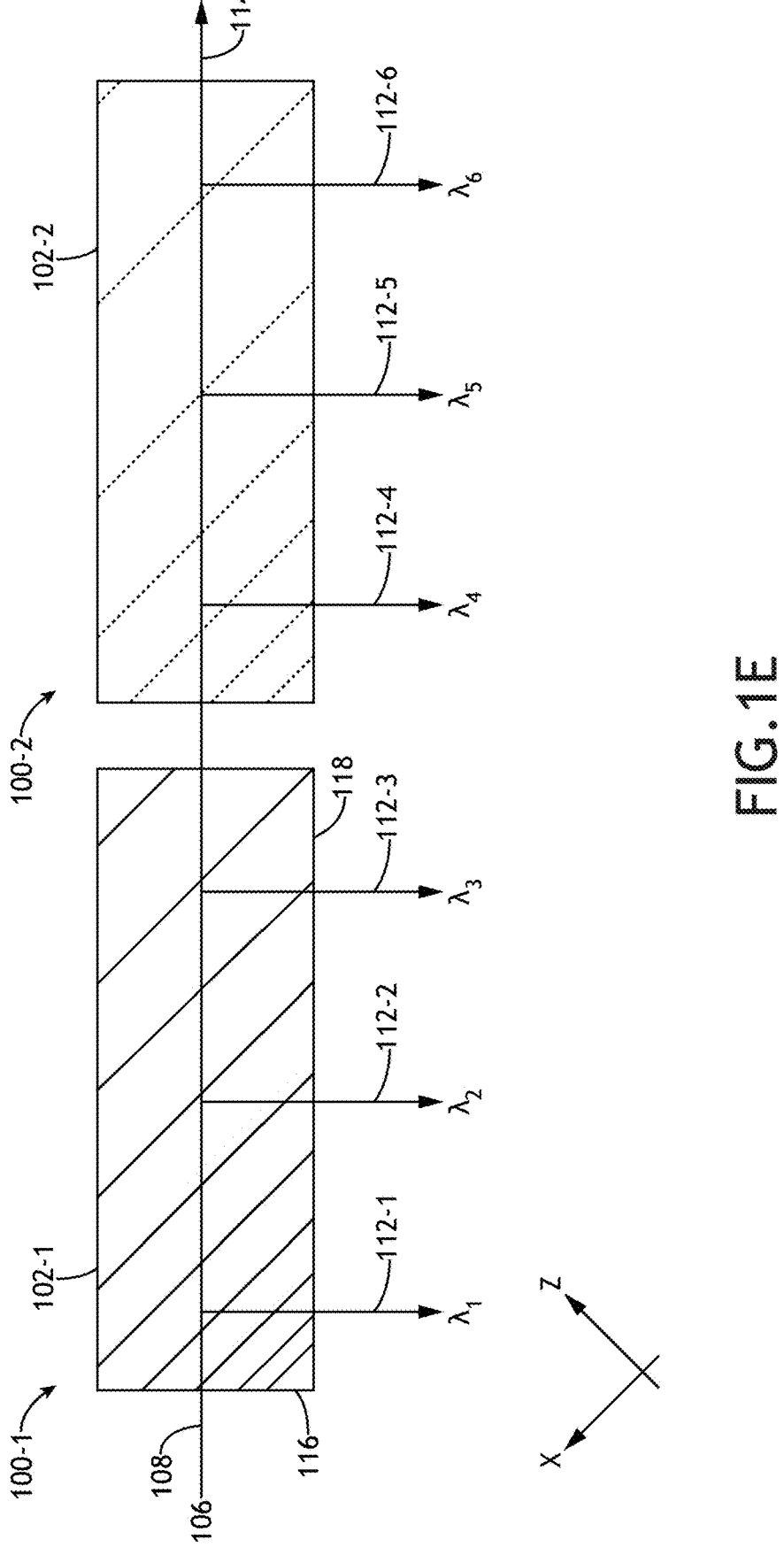
FIG. 1E is a top view of two cascaded r-VBGs, in accordance with one or more embodiments of the present disclosure.

Referring now to FIG. 1E, multiple r-VBGs 100 may be fabricated in separate materials 102 or separate portions of a common material 102 to form a device. Such a configuration may be referred to as a cascaded configuration. FIG. 1E is a top view of two cascaded r-VBGs 100, in accordance with one or more embodiments of the present disclosure. For example, FIG. 1E depicts a first r-VBG 100-1 in a first material 102-1 and a second r-VBG 100-2 in a second material 102-2, where the second r-VBG 100-2 receives transmitted light from the first r-VBG 100-1. FIG. 1E depicts a particular configuration that is similar to FIG. 1D, but where the first r-VBG 100-1 and the second r-VBG 100-2 are fabricated in different materials and are arranged in a cascaded configuration.

In a general sense, multiple r-VBGs 100 may be fabricated in any combination of multiplexed or cascading arrangements. In this way, any combination of r-VBGs 100 within one or more materials 102 is within the spirit and scope of the present disclosure.

Referring generally to FIGS. 1A-1G, additional aspects of r-VBGs 100 are now described in greater detail. An r-VBG 100 may be fabricated in any material 102 that has transparency for the wavelength or wavelengths of interest including, but not limited to, wavelengths in ultraviolet, visible, or infrared spectral regions. This includes but is not limited to glasses, crystals, polymers, sol-gels, and others. Further, an r-VBG 100 may be fabricated using any technique known in the art such as, but not limited to, holographic recording techniques or direct laser writing techniques (e.g., femtosecond laser direct writing techniques).

Figure 1F:
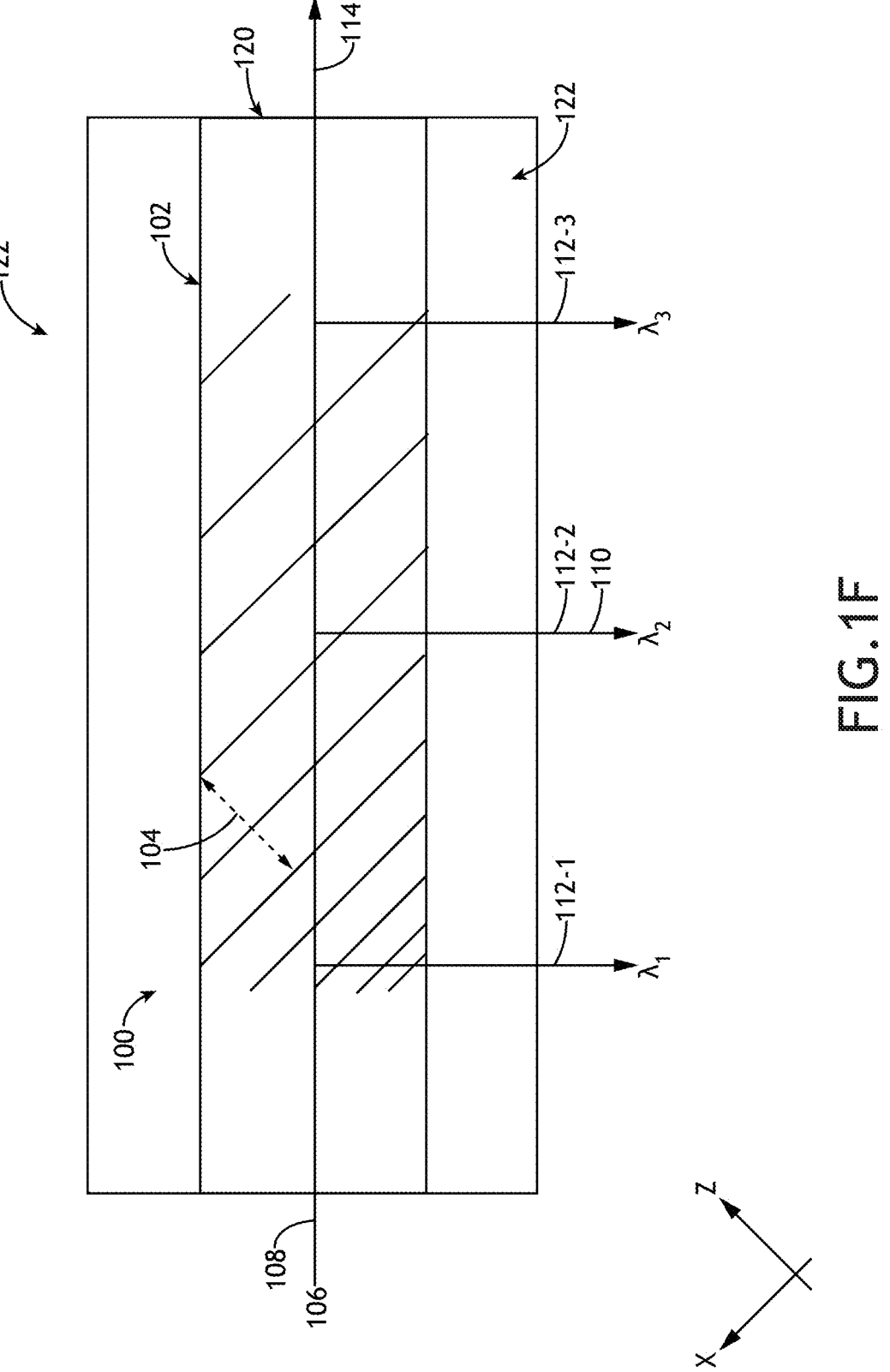
FIG. 1F is a simplified top view of an r-VBG within a waveguide, in accordance with one or more embodiments of the present disclosure.

In some embodiments, an r-VBG 100 is fabricated within a waveguide 120. FIG. 1F is a simplified top view of an r-VBG 100 within a waveguide 120, in accordance with one or more embodiments of the present disclosure. In FIG. 1F, the material 102 in which an r-VBG 100 is formed operates as a waveguide 120 and is at least partially surrounded by cladding material 122 providing a refractive index differential suitable for guiding light.

The waveguide 120 and surrounding cladding material 122 may have any structure known in the art suitable for guiding light. Further, the waveguide 120 may be surrounded by any material or combination of materials having lower refractive index than the waveguide 120. In some embodiments, the waveguide 120 including the r-VBG 100 is fully surrounded by one or more cladding materials 122. Such a configuration may be, but is not required to be, characterized as an embedded waveguide. For example, the waveguide 120 including the r-VBG 100 may be buried within the volume of bulk material 102. As another example, the waveguide 120 including the r-VBG 100 may be fabricated on a substrate and/or film and be surrounded by a cap layer having the same or different composition as the substrate and/or film. As another example, the waveguide 120 including the r-VBG 100 may the core of an optical fiber. In some embodiments, the waveguide 120 including the r-VBG 100 is partially surrounded by cladding material 122. Such a configuration may be, but is not required to be, characterized as a rib waveguide or a ridge waveguide.

Figure 1G:
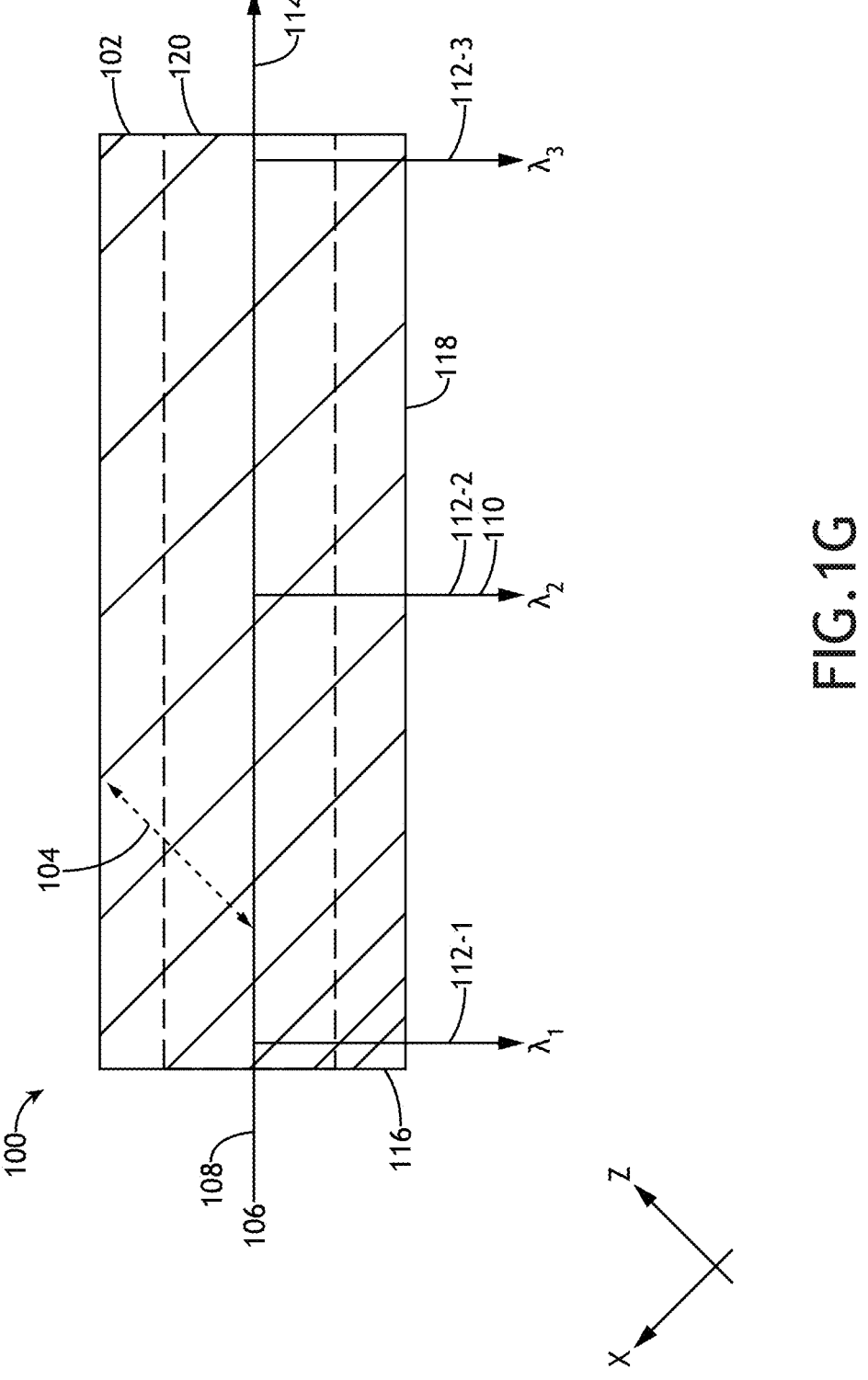
FIG. 1G is a simplified top view of a waveguide within an r-VBG, in accordance with one or more embodiments of the present disclosure.

In some embodiments, a waveguide 120 is fabricated within an r-VBG 100. FIG. 1G is a simplified top view of a waveguide 120 within an r-VBG 100, in accordance with one or more embodiments of the present disclosure. In this configuration, light may be guided as it propagates through the r-VBG 100 along the incidence direction 106.

Referring now to FIGS. 2A-4, systems and methods for spectroscopy using one or more r-VBGs 100 is described in greater detail, in accordance with one or more embodiments of the present disclosure.

Figure 2A:
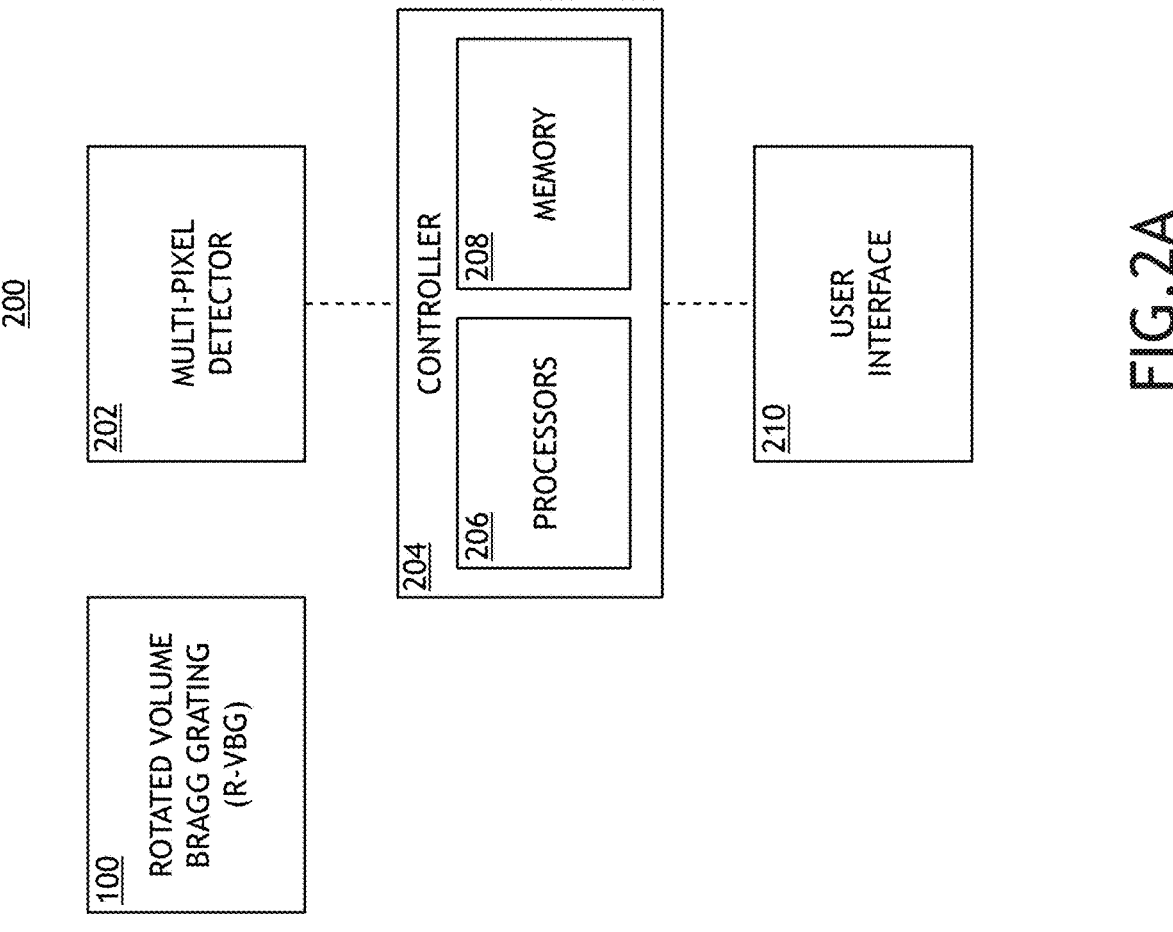
FIG. 2A is a block diagram of a spectrometer incorporating one or more r-VBGs, in accordance with one or more embodiments of the present disclosure.

FIG. 2A is a block diagram of a spectrometer 200 incorporating one or more r-VBGs 100, in accordance with one or more embodiments of the present disclosure.

In some embodiments, a spectrometer 200 includes one or more chirped r-VBGs 100 to spatially resolve one or more spectral bands of input light 108 and one or more multi-pixel detectors 202 to capture the spatially-resolved spectral bands. In this way, the multi-pixel detectors 202 may generate spectral data associated with the spectrum of input light 108 with the associated spectral bands.

In some embodiments, the spectrometer 200 further includes a controller 204 with one or more processors 206 configured to execute program instructions maintained on memory 208 (e.g., a memory medium). In some embodiments, the spectrometer 200 includes a user interface 210, which may provide (e.g., display) data to a user and/or may receive input from a user.

Various aspects of the spectrometer 200 will now be described in greater detail, in accordance with one or more embodiments of the present disclosure.

The spectrometer 200 may include one or more chirped r-VBGs 100 in any arrangement suitable for spatially spreading a spectrum of input light 108 into one or more spectral bands for capture by one or more multi-pixel detectors 202. In the case that a spectrometer 200 includes two or more chirped r-VBGs 100, the chirped r-VBGs 100 may be multiplexed within a single material 102 and/or distributed between multiple materials 102 in a cascaded configuration.

Figure 2B:
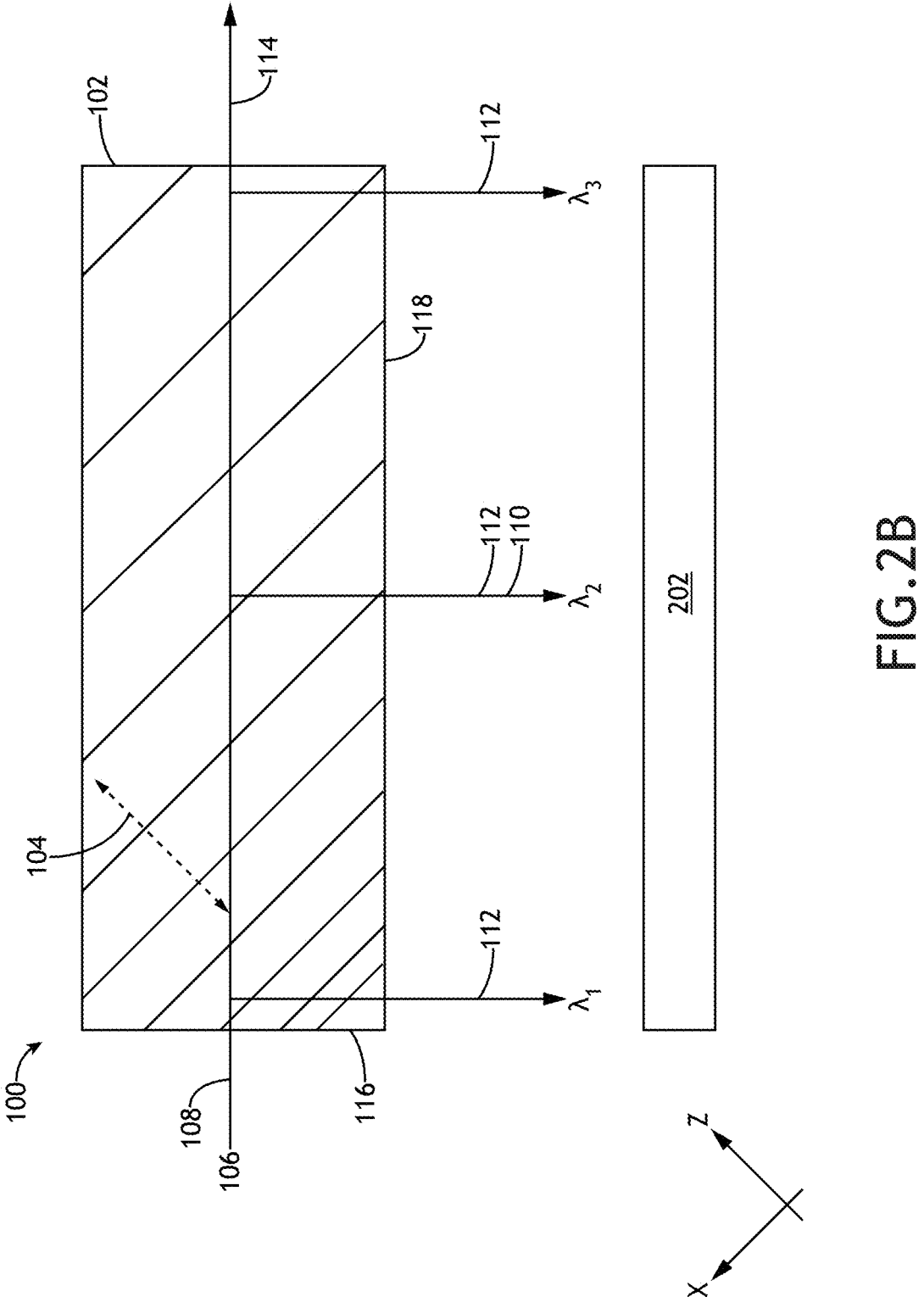
FIG. 2B is a block diagram view of a spectrometer including a single chirped r-VBG to spatially spread the spectrum of input light in one spectral band and a single multi-pixel detector to capture the spectrum in the spectral band, in accordance with one or more embodiments of the present disclosure.

FIG. 2B is a block diagram view of a spectrometer 200 including a single chirped r-VBG 100 to spatially spread the spectrum of input light 108 in one spectral band and a single multi-pixel detector 202 to capture the spectrum in the spectral band, in accordance with one or more embodiments of the present disclosure.

As described previously herein with respect to FIG. 1C, a chirped r-VBG 100 may reflect light that satisfies a Bragg condition (e.g., as reflected light 112), where the Bragg condition is satisfied at different depths along the incidence direction 106 for different wavelengths. As a result, a spatial distribution of the spectral components of the input light 108 may be controlled by the distribution of the refractive index variation of the chirped r-VBG 100. Notably, while it may be convenient to describe the refractive index variation of a chirped r-VBG 100 along its grating vector direction 104 (e.g., as provided in Equation (3)), the spatial distribution of the spectral components of the input light 108 may be more directly related to the refractive index variation along the incidence direction 106.

In a general sense, a spectrometer 200 may include a chirped r-VBG 100 having any refractive index distribution with a non-uniform period. In some embodiments, the refractive index distribution of a chirped r-VBG 100 in a spectrometer 200 varies monotonically along the grating vector direction 104 (and thus monotonically along the incidence direction 106). For example, the refractive index distribution of a chirped r-VBG 100 in a spectrometer 200 may vary linearly, quadratically, or with any other monotonic distribution along the grating vector direction 104. Regardless of the refractive index distribution, spectral data measured by a corresponding multi-pixel detector 202 may be processed and/or calibrated (e.g., by the controller 204) for output in any suitable format or distribution.

As depicted in FIG. 2B, the spatial spread of the spectral components in the reflected light 112-1 through 112-3 along the incidence direction 106 is based on the distribution of the period of the refractive index variation along the incidence direction 106, which has multiple benefits.

For example, the reflected light 112 may collimated or slowly diverging such that the spatial spread of the spectrum of the input light 108 does not change (or changes slowly) with distance from the chirped r-VBG 100. As a result, no free-space propagation, lenses, or other components are needed. Rather, the multi-pixel detector 202 may be placed at any suitable position and may in some cases be in contact with the material 102 in which the chirped r-VBG 100 is formed. This configuration may thus be extraordinarily compact and may further be physically mounted in a package that is robust to vibrations or other mechanical movements.

As another example, the resolved bandwidth (e.g., a range of wavelengths $\Delta\lambda$ that may be captured) may be controlled by the length of the chirped r-VBG 100 along the incidence direction 106 the rate of change of the period of refractive index variation (e.g., the chirp rate $\beta$ in Equation (3)). Further, the spectral resolution (e.g., a minimum wavelength separation S that may be discerned) may be controlled by these parameters as well as a width of the input light 108 in a plane normal to the incidence direction 106, where decreasing the beam width may increase the spectral resolution. As a result, the use of a chirped r-VBG 100 may provide substantial flexibility to balance the resolved bandwidth, the spectral resolution, and the overall size of the device.

It is further contemplated herein that the pixels of a multi-pixel detector 202 may provide spatial sampling of the spatially spread spectrum of the input light 108. In some embodiments, the spectrometer 200 includes at least one chirped r-VBG 100 with a linearly varying period of refractive index variation. Such a configuration may beneficially provide reflected light 112 with linearly varying wavelength along the incidence direction 106 and may further provide linear sampling of the spectrum by the corresponding multi-pixel detector 202. However, this is not a requirement and some applications may benefit from non-linear sampling of a spectrum of the input light 108, which may be achieved through non-linear variations of a period of a chirped r-VBG 100 along its grating vector direction 104 (and thus along the incidence direction 106).

Figure 3A:
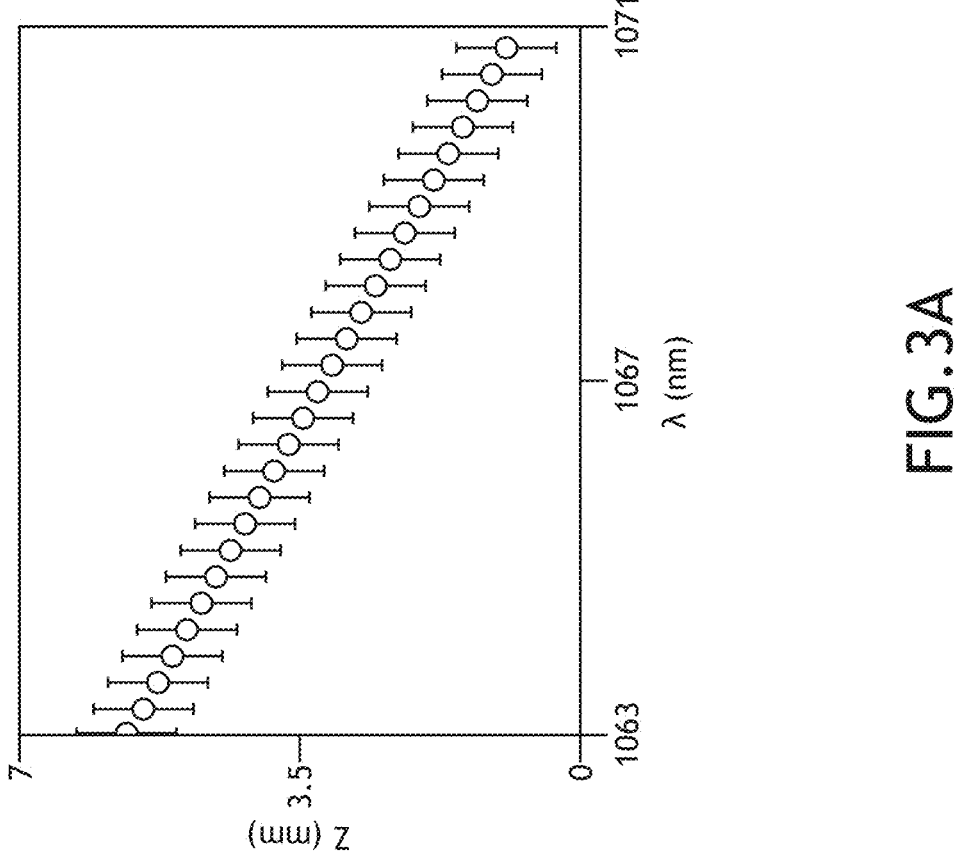
FIG. 3A is a plot depicting a spatially-resolved spectrum of input light, in accordance with one or more embodiments of the present disclosure.
Figure 3B:
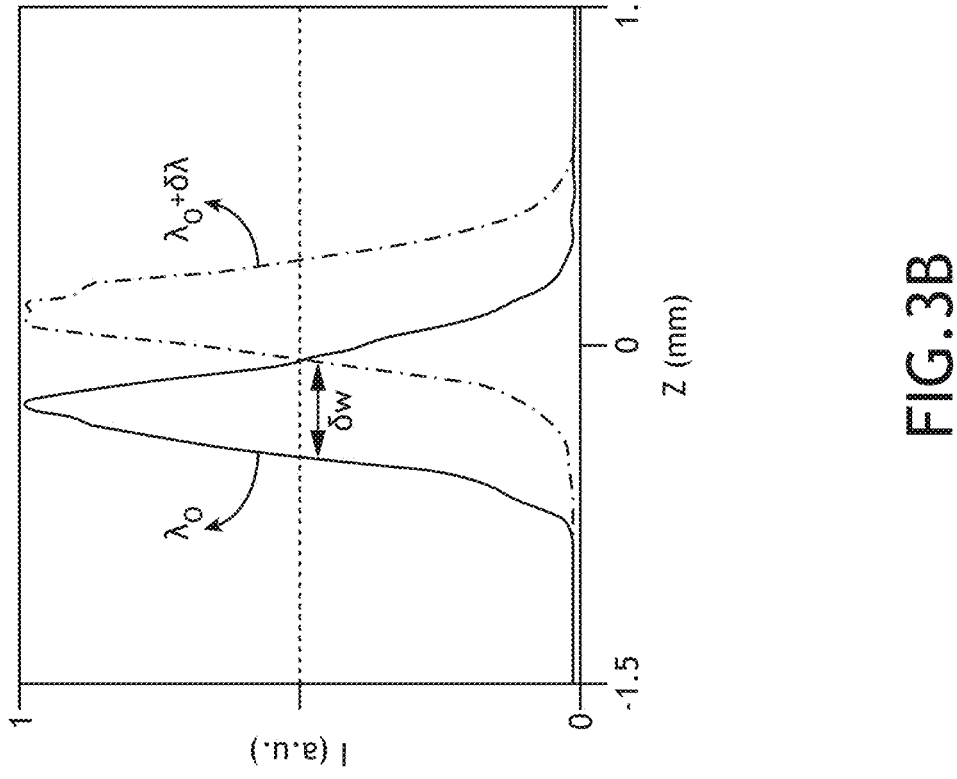
FIG. 3B is a plot illustrating two spectrally-resolved wavelengths, in accordance with one or more embodiments of the present disclosure.
Figure 3C:
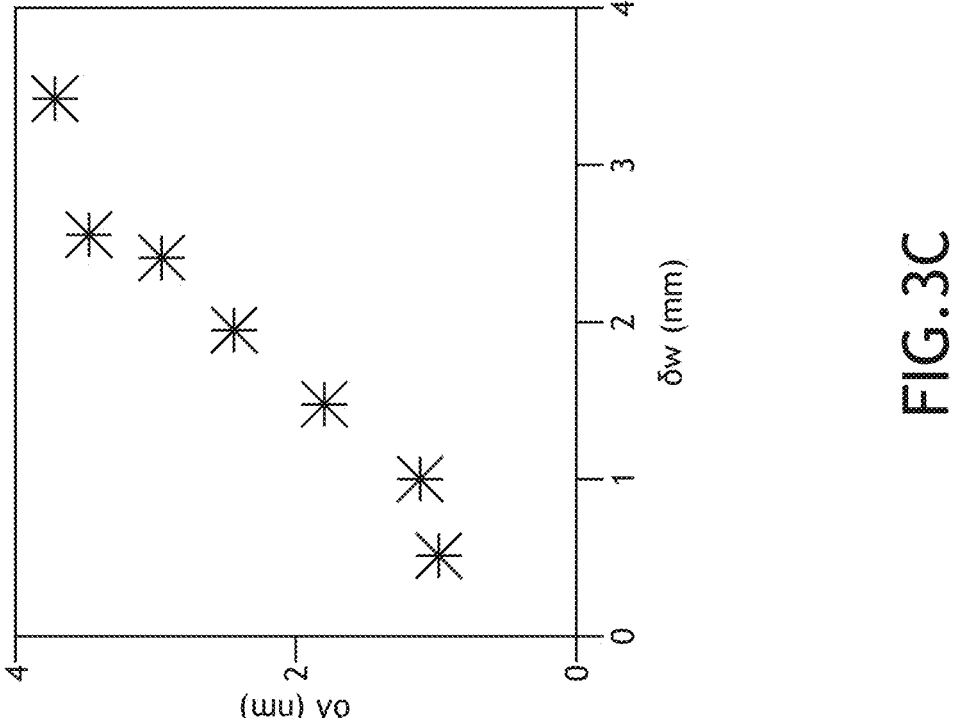
FIG. 3C is a plot illustrating a dependence of the spectral resolution on beam size, in accordance with one or more embodiments of the present disclosure.

Referring now to FIGS. 3A-3C, experimental results associated with a fabricated spectrometer 200 having a design as depicted in FIG. 2A are presented, in accordance with one or more embodiments of the present disclosure. A spectrometer 200 with a chirped r-VBG 100 having a linearly-varying period of refractive index variation was utilized. FIG. 3A is a plot depicting a spatially-resolved spectrum of input light 108, in accordance with one or more embodiments of the present disclosure. FIG. 3B is a plot illustrating two spectrally-resolved wavelengths, in accordance with one or more embodiments of the present disclosure. In this case, the input beam size $\delta W$ was 1 mm. FIG. 3C is a plot illustrating a dependence of the spectral resolution $\delta\lambda$ on beam size $\delta W$, in accordance with one or more embodiments of the present disclosure. As shown in FIG. 3C, reducing the beam width $\delta W$ in a plane normal to the incidence direction 106 may improve the spectral resolution $\delta\lambda$, at least over certain ranges.

Figure 2C:
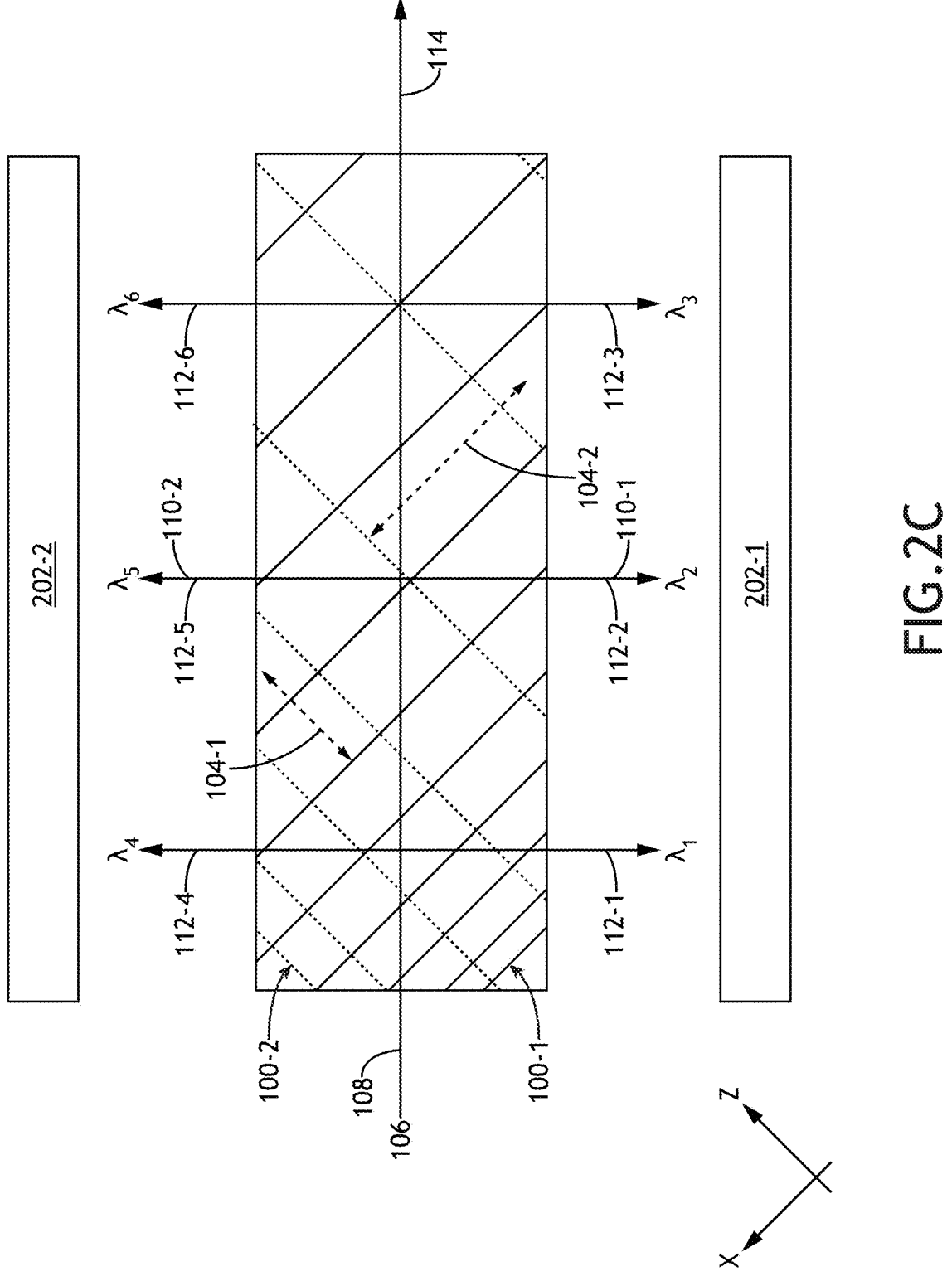
FIG. 2C is a block diagram view of a spectrometer including a two multiplexed chirped r-VBGs in a single volume of material and two multi-pixel detectors to capture the spectrum in two spectral bands, in accordance with one or more embodiments of the present disclosure.
Figure 2D:
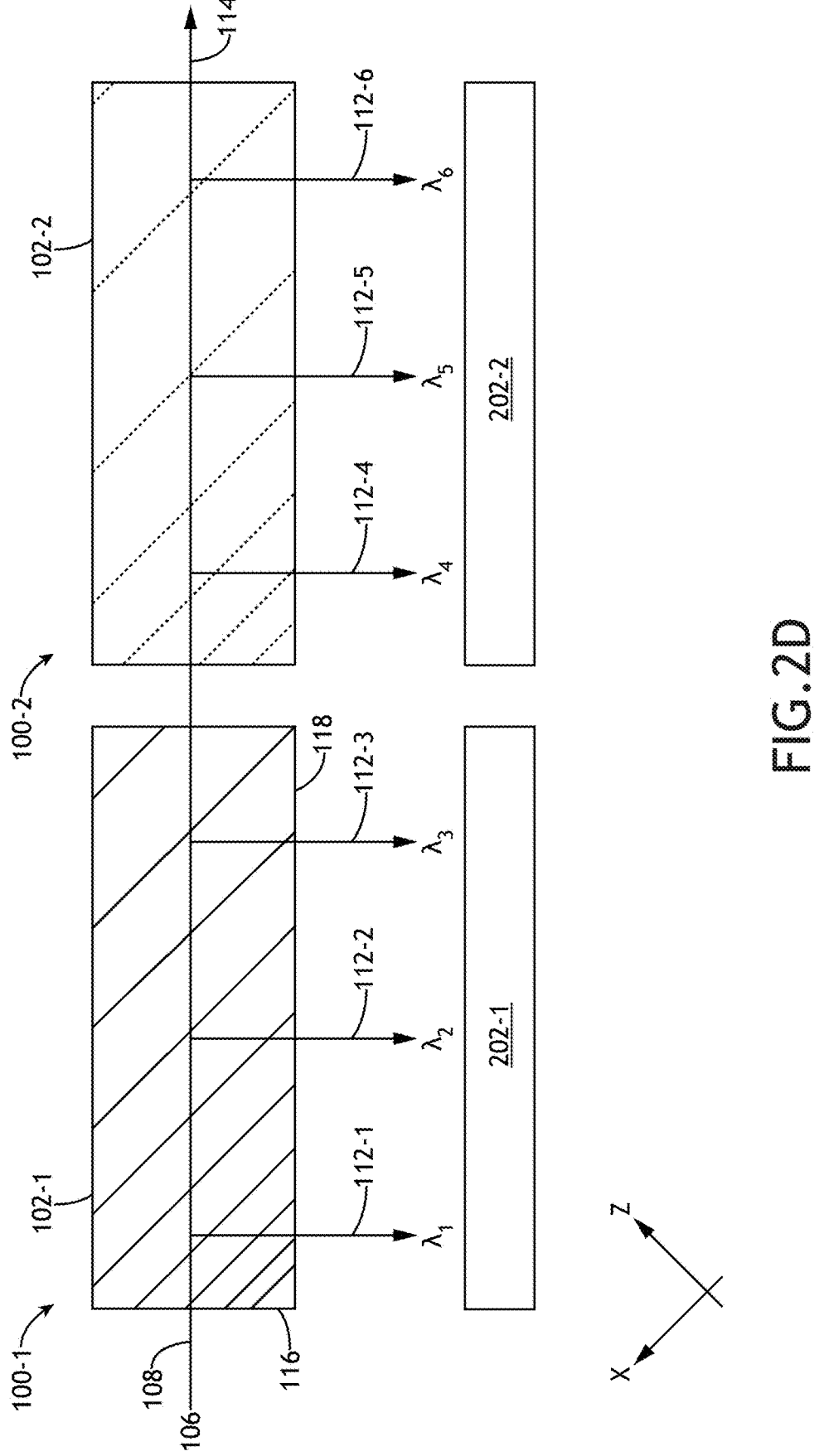
FIG. 2D is a block diagram view of a spectrometer including a two cascaded chirped r-VBGs in two different materials and two multi-pixel detectors to capture the spectrum in two spectral bands, in accordance with one or more embodiments of the present disclosure.

Referring now to FIGS. 2C-2D, the use of multiple r-VBGs 100 and associated multi-pixel detectors 202 to capture spectral data for multiple spectral bands is described in greater detail, in accordance with one or more embodiments of the present disclosure.

FIG. 2C is a block diagram view of a spectrometer 200 including a two multiplexed chirped r-VBGs 100 in a single volume of material 102 and two multi-pixel detectors 202 to capture the spectrum in two spectral bands, in accordance with one or more embodiments of the present disclosure. The two chirped r-VBGs 100 in FIG. 2C are substantially similar to those depicted in FIG. 1D such that relevant descriptions apply. In FIG. 2C, a first multi-pixel detector 202-1 is arranged near a first output face 118-1 to receive the spectrally-resolved reflected light 112 from a first chirped r-VBG 100-1, while a second multi-pixel detector 202-2 is arranged near a first output face 118-2 to receive the spectrally-resolved reflected light 112 from a first chirped r-VBG 100-2. Further, the first chirped r-VBG 100-1 may provide spectral content in a first spectral band (e.g., represented as $\lambda_1$ to $\lambda_3$, whereas the second chirped r-VBG 100-2 may provide spectral content in a second spectral band (e.g., represented as $\lambda_4$ to $\lambda_6$).

It is to be understood, however, that FIG. 2C and the associated description are provided solely for illustrative purposes and should not be interpreted as limiting the scope of the present disclosure. For example, any particular chirped r-VBG 100 may be oriented with any non-zero angle with respect to the incidence direction 106 and is not limited to a 45-degree angles as depicted in FIG. 2C. As another example, the material 102 may include any number of chirped r-VBGs 100 configured to direct associated reflected light 112 from any number of corresponding output faces 118. In this way, any number of spectral bands may be measured simultaneously by associated multi-pixel detectors 202. As an illustration, although not shown, the material 102 in FIG. 2C may further two additional chirped r-VBGs 100 (e.g., providing resolution in two additional spectral bands) arranged with a diffraction plane that is orthogonal to the X-Z plane. In this configuration, two additional multi-pixel detectors 202 may be placed near additional output faces 118 within the X-Z plane (e.g., above and below the material 102 in FIG. 2C). Such a configuration may provide simultaneous measurements of four spectral bands.

FIG. 2D is a block diagram view of a spectrometer 200 including a two cascaded chirped r-VBGs 100 in two different materials 102 and two multi-pixel detectors 202 to capture the spectrum in two spectral bands, in accordance with one or more embodiments of the present disclosure. A cascaded configuration of chirped r-VBGs 100 may also enable capture spectral data within multiple spectral bands as demonstrated in FIG. 2C, but may correspond to a different tradeoff between the size and complexity of the spectrometer 200.

Referring generally to FIGS. 2C and 2D, it is further contemplated herein that the efficiency of reflection of light satisfying a Bragg condition (e.g., the generation of reflected light 112) may be polarization sensitive. In particular, the diffraction efficiency may be greatest for light having a polarization normal to the diffraction plane formed by the grating vector direction 104 and the incidence direction 106 and lowest for light having a polarization within the diffraction plane. In this way, an expected polarization of the input light 108 may impact whether multiplexed or cascaded r-VBGs 100 are more suitable for a particular application. For example, if input light 108 is unpolarized, either configuration may be used. However, if input light 108 is polarized, it may be beneficial to along the polarization to be orthogonal to the diffraction plane of any chirped r-VBGs 100 to provide high efficiency.

Referring again to FIG. 2A, various additional aspects of the spectrometer 200 are described in greater detail, in accordance with one or more embodiments of the present disclosure.

A multi-pixel detector 202 may include any type of multi-pixel sensor known in the art. For example, a multi-pixel detector 202 may include one-dimensional or two-dimensional sensor such as, but not limited to, a charge-coupled device (CCD) or a complementary metal-oxide-semiconductor (CMOS) device. As another example, a multi-pixel detector 202 may include an array of discrete photodiodes.

The controller 204 may be communicatively coupled to any component of the spectrometer 200 and/or any external systems. In this way, the controller 204 may receive data from and/or direct (e.g., via control signals) any of the components of the spectrometer 200 such as, but not limited to, the one or more multi-pixel detectors 202. Further, the program instructions may cause the processors 206 to execute various actions or process steps as disclosed herein. For example, the controller 204 may receive spectral data from any of the multi-pixel detectors 202 associated with input light 108, calibrate the spectral data, and/or display any of the spectral data to a user (e.g., display a visual representation of a spectrum of input light 108).

The one or more processors 206 of a controller 204 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FP-GAs), or one or more digital signal processors (DSPs)). In this sense, the one or more processors 206 may include any device configured to execute algorithms and/or instructions (e.g., program instructions stored in memory). In one embodiment, the one or more processors 206 may be embodied as a desktop computer, mainframe computer system, workstation, image computer, parallel processor, networked computer, or any other computer system configured to execute a program configured to operate or operate in conjunction with the spectrometer 200, as described throughout the present disclosure Moreover, different components of the spectrometer 200 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 204 may be formed as one or more controllers housed in a common housing or within multiple housings. In this way, any controller or combination of controllers may be separately packaged as a module suitable for integration into the spectrometer 200.

The memory 208 may include any storage medium known in the art suitable for storing program instructions executable by the associated one or more processors 206. For example, the memory 208 may include a non-transitory memory medium. By way of another example, the memory 208 may include, but is not limited to, a read-only memory (ROM), a random-access memory (RAM), a magnetic or optical memory device (e.g., disk), a magnetic tape, a solid-state drive and the like. It is further noted that memory 208 may be housed in a common controller housing with the one or more processors 206. In one embodiment, the memory 208 may be located remotely with respect to the physical location of the one or more processors 206 and controller 204. For instance, the one or more processors 206 of controller 204 may access a remote memory (e.g., server), accessible through a network (e.g., internet, intranet and the like).

The user interface 210 may include any component or combination of components known in the art suitable for providing information to a user and/or receiving inputs from a user. For example, the user interface 210 may include, but is not limited to, one or more desktops, laptops, tablets, and the like. In embodiments, the user interface 210 includes a display used to display data of the spectrometer 200 to a user. The display of the user interface 210 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 210 is suitable for implementation in the present disclosure. In embodiments, a user may input selections and/or instructions responsive to data displayed to the user via a user input device of the user interface 210 such as, but not limited to, a keyboard, a mouse, a touchscreen, or an audio interface (e.g., a voice interface suitable for accepting audio commands from a user).

Figure 4:
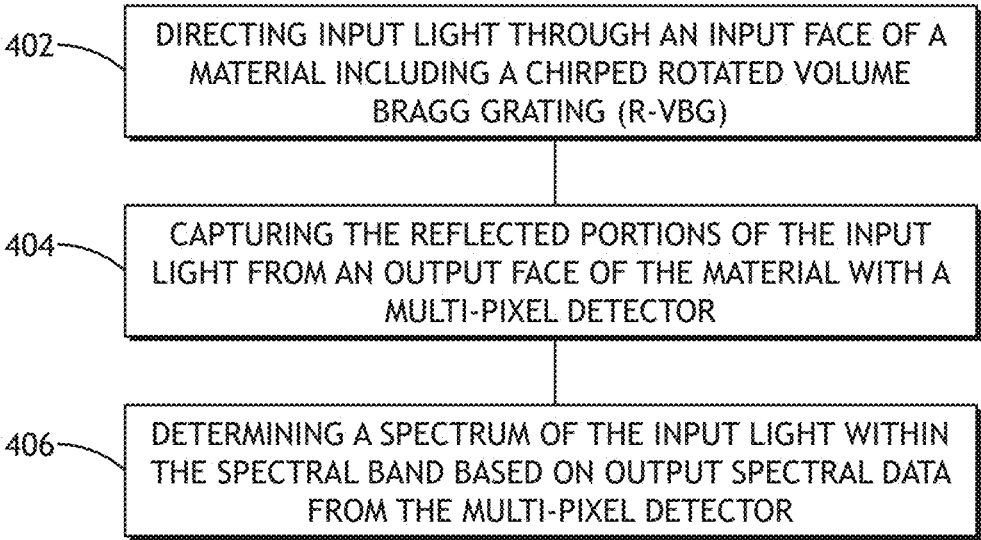
FIG. 4 is a flow diagram illustrating steps performed in a method for spectroscopy using one or more chirped r-VBGs, in accordance with one or more embodiments of the present disclosure.

Referring now to FIG. 4, FIG. 4 is a flow diagram illustrating steps performed in a method 400 for spectroscopy using one or more chirped r-VBGs 100, in accordance with one or more embodiments of the present disclosure. Applicant notes that the embodiments and enabling technologies described previously herein in the context of the spectrometer 200 should be interpreted to extend to the method 400. It is further noted, however, that the method 400 is not limited to the architecture of the spectrometer 200.

In some embodiments, the method 400 includes a step 402 of directing input light 108 through an input face of a material 102 including a chirped r-VBG 100. In some embodiments, the method 400 includes a step 404 of capturing the reflected portions of the input light 108 (e.g., capturing reflected light 112) from an output face 118 of the material 102 with a multi-pixel detector 202. In some embodiments, the method 400 includes a step 406 of determining a spectrum of the input light 108 within the spectral band based on output spectral data from the multi-pixel detector 202.

Further, in some embodiments, though not shown in FIG. 4, the method 400 includes a step of calibrating the spectral data received from the multi-pixel detector 202. For example, it may be the case that the precise spatial distribution of the spectrum of the input light 108 generated by a chirped r-VBG 100 and/or the amplitude distribution of as a function of wavelength may depend on the precise distribution of the period of refractive index variation along the grating vector direction 104 and may be impacted by any defects in the fabrication process. Accordingly, the spectral data received from the multi-pixel detector 202 may be calibrated to compensate for the precise distribution of the period of refractive index variation along the grating vector direction 104. As another example, the spectral data received from the multi-pixel detector 202 may be calibrated to compensate for variations of an incidence direction 106 of input light 108 (e.g., deviations from a direction normal of an input face 116).

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A spectrometer comprising:
a rotated volume Bragg grating (r-VBG) within a volume of a material having an input face, wherein the r-VBG is formed as planes of refractive index variation with periodicity along a grating vector at a non-zero angle relative to a normal vector of the input face, wherein the r-VBG reflects portions of input light propagating through the input face that satisfies a Bragg condition for wavelengths within a spectral band, wherein a period of the r-VBG along the grating vector is chirped to vary along the grating vector to provide that the Bragg condition is satisfied for different wavelengths at different depths, wherein a spectrum of the input light is spatially resolved in the reflected portions of the input light by the r-VBG; and
a multi-pixel detector configured to receive the reflected portions of the input light from the r-VBG, wherein the multi-pixel detector is configured to output spectral data indicative of the spectrum of the input light within the spectral band.

2. The spectrometer of claim 1, wherein the non-zero angle between the normal vector of the input face and the grating vector of the r-VBG is 45 degrees.

3. The spectrometer of claim 1, further comprising:
a controller including one or more processors configured to execute program instructions causing the one or more processors to:
receive the data from the multi-pixel detector; and
calibrate the spectral data based on calibration data to provide calibrated spectral data.

4. The spectrometer of claim 1, further comprising:
a display configured to provide a visual representation of the spectrum of the input light.

5. The spectrometer of claim 1, wherein the multi-pixel detector is in contact with an output face of the material.

6. The spectrometer of claim 1, wherein the period of the r-VBG along the grating vector is chirped to vary monotonically along the grating vector.

7. The spectrometer of claim 1, wherein the period of the r-VBG along the grating vector is chirped to vary linearly along the grating vector.

8. The spectrometer of claim 1, wherein the period of the r-VBG along the grating vector is chirped with a distribution selected to provide that the reflected portions of the input light by the r-VBG are spatially resolved across the output face within a distribution that is linear as a function of wavelength.

9. The spectrometer of claim 1, wherein the multi-pixel detector comprises:
at least one of a charge coupled device (CCD), a complementary metal-oxide-semiconductor (CMOS) device, or an array of photodiodes.

10. The spectrometer of claim 1, further comprising:

an additional r-VBG, wherein the additional r-VBG is formed as planes of refractive index variation with periodicity along one or more additional grating vectors at one or more additional non-zero angles relative to the normal vector of the input face, wherein the additional r-VBG reflects portions of input light propagating along the incidence vector through the input face that satisfies a Bragg condition for wavelengths within an additional spectral band, wherein a period of the additional r-VBG along the additional grating vector is chirped to vary along the grating vector to provide that the Bragg condition is satisfied for different wavelengths within the additional spectral band at different depths, wherein the spectrum of the input light in the additional spectral band is spatially resolved in the reflected portions of the input light by the additional r-VBG; and an additional multi-pixel detector configured to receive the reflected portions of the input light from the additional r-VBG through the additional output face, wherein the multi-pixel detector is configured to output additional spectral data indicative of a spectrum of the input light in the additional spectral band.

11. The spectrometer of claim 10, wherein the non-zero angle between the normal vector of the input face and the grating vector of the r-VBG is +45 degrees, wherein the non-zero angle between the normal vector of the input face and the grating vector of the additional r-VBG is −45 degrees.

12. The spectrometer of claim 10, wherein the spectral band and the additional spectral band are non-overlapping.

13. The spectrometer of claim 10, wherein the spectral band and the additional spectral band at least partially overlap.

14. A method comprising:

directing input light through an input face of a material including a rotated chirped volume Bragg grating (r-VBG) within a volume of the material, wherein the r-VBG is formed as planes of refractive index variation with periodicity along a grating vector at a non-zero angle relative to a normal vector of the input face, wherein the r-VBG reflects portions of input light propagating along an incidence vector through the input face that satisfies a Bragg condition for wavelengths within a spectral band, wherein a period of the r-VBG along the grating vector is chirped to vary along the grating vector to provide that the Bragg condition is satisfied for different depths, wherein the reflected portions of the input light by the r-VBG are spatially resolved in the reflected portions of the input light by the r-VBG; and capturing the reflected portions of the input light from the output face with a multi-pixel detector;

determining a spectrum of the input light within the spectral band based on output spectral data from the multi-pixel detector.

15. The method of claim 14, wherein the non-zero angle between the normal vector of the input face and the grating vector of the r-VBG is 45 degrees.

16. The method of claim 14, further comprising:

calibrating the spectral data received from the multi-pixel detector.

17. The method of claim 14, further comprising:

displaying a visual representation of the spectrum of the input light on a display.

18. The method of claim 14, wherein the multi-pixel detector is in contact with an output face.

19. The method of claim 14, wherein the period of the r-VBG along the grating vector is chirped to vary monotonically along the grating vector.

20. The method of claim 14, wherein the period of the r-VBG along the grating vector is chirped to vary linearly along the grating vector.

21. The method of claim 14, wherein the period of the r-VBG along the grating vector is chirped to vary monotonically along the grating vector with a distribution selected to provide that the reflected portions of the input light by the r-VBG are spatially resolved across the output face within a distribution that is linear as a function of wavelength.

22. A spectrometer comprising:

two or more rotated volume Bragg gratings (r-VBGs), wherein each of the r-VBGs is formed as planes of refractive index variation with periodicity along a respective grating vector at a respective non-zero angle relative to a normal vector of a respective input face of a respective material, wherein each the r-VBGs reflects portions of input light that satisfies a Bragg condition for a wavelengths within a respective spectral band, wherein a period of each the r-VBGs along the respective grating vector is chirped to vary along the respective grating vector with a distribution providing that the Bragg condition is satisfied for different wavelengths within the respective spectral band at different locations and further providing that the reflected portions of the input light are spatially resolved in the reflected portions of the input light by the r-VBG; and two or more multi-pixel detectors, each configured to generate spectral data indicative of a spectrum of the input light from a respective one of the r-VBGs.

23. The spectrometer of claim 22, wherein at least two of the two or more r-VBGs are multiplexed within a common volume.

24. The spectrometer of claim 22, wherein at least two of the two or more r-VBGs are cascaded.

25. The spectrometer of claim 22, wherein at least two of the two or more r-VBGs are cascaded in a common material.

26. The spectrometer of claim 22, wherein at least two of the two or more r-VBGs are cascaded in different materials.

27. The spectrometer of claim 22, wherein the spectral bands associated with the two or more r-VBGs are non-overlapping.

28. The spectrometer of claim 22, wherein the spectral band associated with one of the r-VBGs at least partially overlaps the spectral band associated with another of the r-VBGs.

29. The spectrometer of claim 22, wherein the respective grating vectors for each of the r-VBGs is different.

* * * * *